United States Patent [19]

Agius

[11] Patent Number: 5,299,980
[45] Date of Patent: Apr. 5, 1994

[54] CONSTANT VELOCITY FLEXIBLE COUPLING AND CONNECTION WITH THE DRIVE AND DRIVEN MEMBERS

[75] Inventor: Jerome G. Agius, Ridgefield, Conn.

[73] Assignee: Nordex Inc., Danbury, Conn.

[21] Appl. No.: 903,982

[22] Filed: Jun. 24, 1992

[51] Int. Cl.⁵ .............................................. F16D 3/16
[52] U.S. Cl. ...................................... 464/99; 464/147; 464/180
[58] Field of Search ................ 403/310, 312, 313, 337

[56] References Cited

U.S. PATENT DOCUMENTS

| | | | |
|---|---|---|---|
| D. 201,916 | 8/1965 | Sabadash | D55/1 |
| 1,377,101 | 5/1921 | Sparling | 403/313 X |
| 1,557,958 | 10/1925 | Anderson | |
| 2,869,339 | 1/1959 | Drake | 464/85 |
| 2,888,258 | 5/1959 | Hoffstrom | |
| 3,068,666 | 12/1962 | Sabadash | |
| 3,071,942 | 1/1963 | Alcaro | |
| 3,074,293 | 1/1963 | Langsetmo | 464/180 X |
| 3,150,506 | 9/1964 | Alcaro | |
| 3,390,546 | 7/1968 | Jewell | |
| 3,527,062 | 9/1970 | Bilinski et al. | |
| 3,844,137 | 10/1974 | Zugel | |
| 3,917,424 | 11/1975 | Zugel | 403/313 X |
| 4,203,305 | 5/1980 | Williams | |
| 4,449,955 | 5/1984 | Watanabe et al. | 464/78 |
| 4,472,713 | 9/1984 | Breslow | 464/182 X |
| 4,645,473 | 2/1987 | Mochizuki | 464/182 X |
| 4,690,661 | 9/1987 | Fredericks et al. | 464/78 |
| 5,041,060 | 8/1991 | Hendershot | 464/86 |
| 5,062,619 | 11/1991 | Sato | 403/78 X |
| 5,069,076 | 12/1991 | Rosenthal | 403/310 X |

FOREIGN PATENT DOCUMENTS

| | | | |
|---|---|---|---|
| 925027 | 3/1955 | Fed. Rep. of Germany | |
| 60-53221 | 3/1985 | Japan | 464/78 |

OTHER PUBLICATIONS

Price List, Renbrandt Inc. Mar. 1, 1984.

*Primary Examiner*—Daniel P. Stodola
*Attorney, Agent, or Firm*—Ware, Fressola, Van Der Sluys & Adolphson

[57] ABSTRACT

A constant velocity flexible coupling for coupling two shafts has a solid unitary body with a plurality of complimentary pairs of slots positioned between a first and second end. The body also has a first and second slotted hub protruding therefrom. Single slot counterbalanced clamps are positioned over the slotted hubs so as to clamp shafts inserted into the hubs to the coupling.

12 Claims, 2 Drawing Sheets

CONSTANT VELOCITY FLEXIBLE COUPLING AND CONNECTION WITH THE DRIVE AND DRIVEN MEMBERS

FIELD OF THE INVENTION

The present invention relates to a substantially constant velocity flexible torque coupling for coupling two shafts, and more particularly to a constant velocity flexible coupling providing reduced static and dynamic imbalance when coupled to two misaligned shafts.

BACKGROUND OF THE INVENTION

The use of flexible couplings for interconnecting driving and driven shafts of precision instruments wherein the coupling is capable of accommodating shaft misalignments and axial shaft movements and permits limited torsional or radial deflection thereof is well known. Some examples of such flexible couplings are shown by U.S. Pat. No. 4,203,305 which discloses a flexible coupling for torque transmission having a plurality of helical beams, and by U.S. Pat. No. 3,071,942 which discloses a flexible coupling having a first plurality of parallel slots cut into a body and a second plurality of parallel slots cut between the first plurality at a 90° angle. In both examples, a portion of the ends of two shafts are inserted into the bores of hubs at opposite ends of the coupling. Each hub has a bore which has an inside diameter essentially the same as the diameter of the shaft which is to be inserted therein. After insertion, the shafts are fixedly attached to the hub by a set screw threaded into an aperture in the side of the hub. Unfortunately, the use of a set screw forces the shaft, within the tolerance of the bore of the hub, to move to a side of the bore opposite that of the set screw. Because the shaft is not aligned in the bore of the hub, dynamic loading of the flexible coupling results and thereby reduces the effectiveness of the flexible coupling's ability to transfer torque smoothly from the driving shaft to the driven shaft. Sometimes a shaft is fixedly attached to a hub by a separate single or double slotted clamp or, in some cases the shaft is fixedly attached to a flexible coupling body by a hub-slotted clamp assembly which is integral to the body as shown in U.S. Pat. No. 3,150,506. Whether an integral or separate, single or double slotted clamp is used to secure the shaft, such devices often cause the shaft, within the tolerance of the bore, to move to the side opposite that of the clamping screw. This in turn causes static and dynamic imbalance and dynamic loading of the flexible coupling, which reduces its effectiveness for transferring torque. The flexible coupling of the present invention incorporates an improved clamping mechanism to effectively reduce the static and dynamic imbalances caused by the clamping systems of the prior art, thereby eliminating the imbalances and preloading of the coupling.

SUMMARY OF THE INVENTION

The present invention relates to a constant velocity flexible coupling for joining two misaligned shafts comprising a unitary cylindrical body having a means for flexing disposed between two hubs. The hubs each have a bore therein and have at least one diametric slot running from a point adjacent to a first end of the hub, joined to the body, to a second terminating end of the hub. The two shafts are secured to the coupling by inserting each into one of the slotted hubs followed by fastening a separate single slotted balanced clamp around the slotted hub.

One objective of the present invention is to provide a constant velocity flexible coupling for joining two misaligned shafts.

Another objective of the present invention is to provide a constant velocity flexible coupling with reduced inherent dynamic loading.

Another objective of the present invention is to provide a clamping system for securing a shaft to the hub of the flexible coupling so as to reduce dynamic and static imbalance and loading.

Other objects and advantages of the present invention will become apparent to those skilled in the art from the following detailed description read in conjunction with the attached drawings and claims appended hereto.

DETAILED DESCRIPTION OF THE INVENTION

Figure 7:
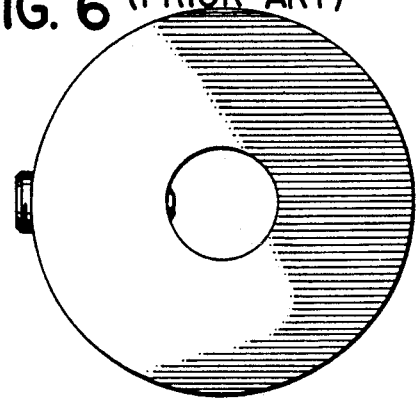
FIG. 7 is an elevational view of a double slotted clamp of the prior art.

Now referring to FIGS. 1, 2, 3, 4 and 5, the constant velocity flexible coupling 20 comprises a cylindrical body 22 formed from a unitary elastically flexible, "springing" metal alloy such as 17-4 precipitation hardened stainless steel or beryllium copper heat treatable alloy or any other suitable metal alloy having physical properties which give a flexing, springing action when used in the present invention as hereinafter described. The body 22 has a first cylindrical slotted hub 24 and a second cylindrical slotted hub 26 integrally attached at opposite ends. Each hub has a concentric axial bore 28 therein. The slots of each hub extend in an axial direction along the length of the hub up to a point where the hub is attached to the main body. As will be seen and described more fully later, the slots allow slight deformation of the hub so as to better align and secure the coupling to a shaft inserted into the bore of the hub.

Figure 16:
FIG. 16 is a fragmentary view of a beam of the flexible coupling having varying thickness along its length.
Figure 4:
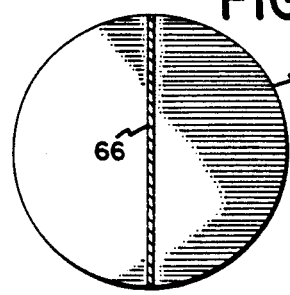
FIG. 4 is a transverse sectional view through a slot adjacent to the slot shown in FIG. 3 taken on a plane essentially along the line 4—4 of FIG. 1 showing vertical positioning of a beam between two adjacent disks and vertical positioning of a beam immediately adjacent to a horizontal beam.

The body 22 has a plurality of disks 110, 111, 112, 113, 114, 115, and 116 disposed between the hubs. The disks are formed by first and second pluralities of complementary pairs of slots. The first plurality of complementary pairs of slots 34, 36, 38, 40, 42 and 44 extend inwardly from the circumference of the body to a predetermined depth so as to form a first plurality of beams 46, 48 and 50 between the complimentary pairs of slots (e.g. beam 46 between slot pairs 34 and 36), joining and bridging the space between adjacent disks. The second plurality of complimentary pairs of slots 52, 54, 56, 58, 60 and 62 is alternately disposed between the first plurality of complimentary pairs of slots. The second plurality of complimentary pairs of slots also extend inwardly to the same depth as the first plurality of slots so as to form a second plurality of beams 64, 66 and 68 between the second plurality of complimentary pairs of slots, and bridging between adjacent disks. The beams of the second plurality are of equal thickness to the first plurality but angularly offset 90° from the first plurality. The beams resulting from the complimentary pairs of slots may have uniform or varying thickness (see FIG. 16) along its length.

To prevent premature failure and permanent deformation of the coupling due to bending of the beams beyond their elastic or fatigue endurance stress limits, the thickness of the slots, the thickness of the beams and the diameter of the body are dimensioned so that two adjacent disks will make contact at the circumference of the body (as shown at 120 in FIG. 2) before the adjoining beam between them reaches its elastic limit where it will be permanently deformed. For example, to prevent failure, the disks of a flexible coupling having relatively thin beams (i.e. deeper slots) will be larger than the disks of a flexible looping having relatively thick beams (i.e. shallower slots).

Figure 6:
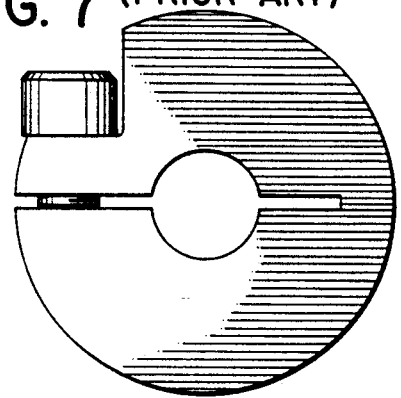
FIG. 6 is an elevational view of a set screw type clamp of the prior art.
Figure 1:
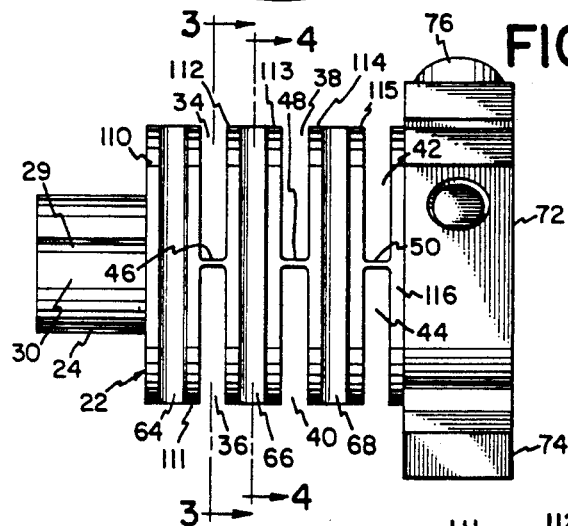
FIG. 1 is an elevational front view of a constant velocity flexible coupling embodying the features of the present invention, including the use of a balanced clamp.
Figure 5:
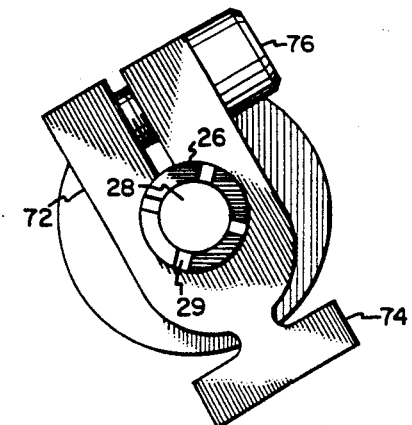
FIG. 5 is an end elevational view of the end of the constant velocity flexible coupling of FIG. 1 and showing a four slot hub clamped by a single slotted balanced clamp.
Figure 2:
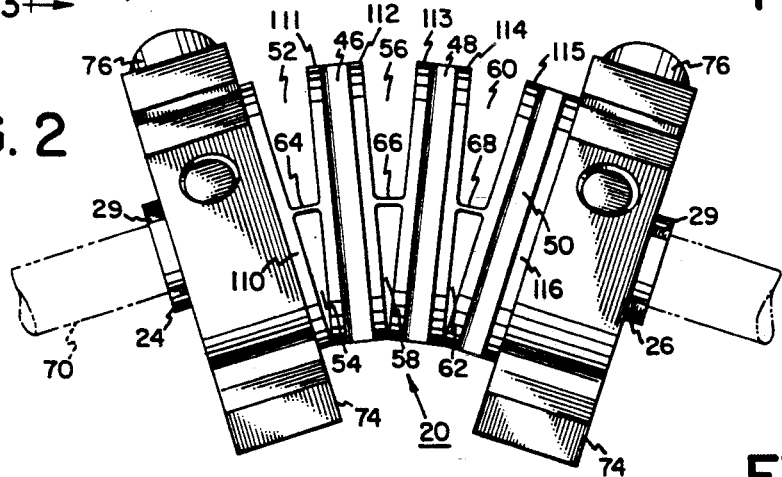
FIG. 2 is another elevational front view of the flexible coupling of FIG. 1 showing the body of the coupling rotated 90°, in a flexed position and having an additional clamp securing a second shaft at an opposite end.
Figure 3:
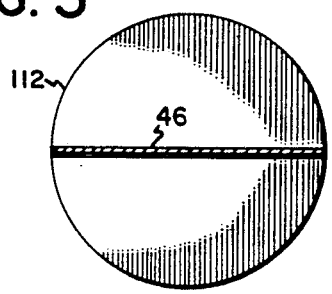
FIG. 3 is a transverse sectional view through a slot taken on a plane essentially along line 3—3 of FIG. 1 showing horizontal positioning of a beam between two adjacent disks which form a pair of slots.

A shaft 70 is secured to the coupling 20, for example, by placing a single slot counterweighted clamp 72 around the outer circumference 30 of the slotted hub 26 after a shaft has been inserted into the bore 28. The clamp 72 has a counterweight 76 for balancing the inertial weight of clamping screw 76. The single slotted clamp provides better clamping pressure around the shaft than clamps of the prior art shown in FIGS. 6 and 7 because it applies a more uniform pressure on the outer circumference of the slotted hub. Because the hub has a plurality of axial slots 29 along its entire length, the inside diameter of the hub can be deformed so as to apply a more evenly distributed pressure against the shaft thereby eliminating static and dynamic imbalances induced by poor axial alignment of the shaft 70 with respect to the coupling 20. While the preferred embodiment illustrates a flexible coupling having four coaxial slots on each hub, other numbers of equally spaced slots may be used without departing from the spirit of the invention.

Figure 9:
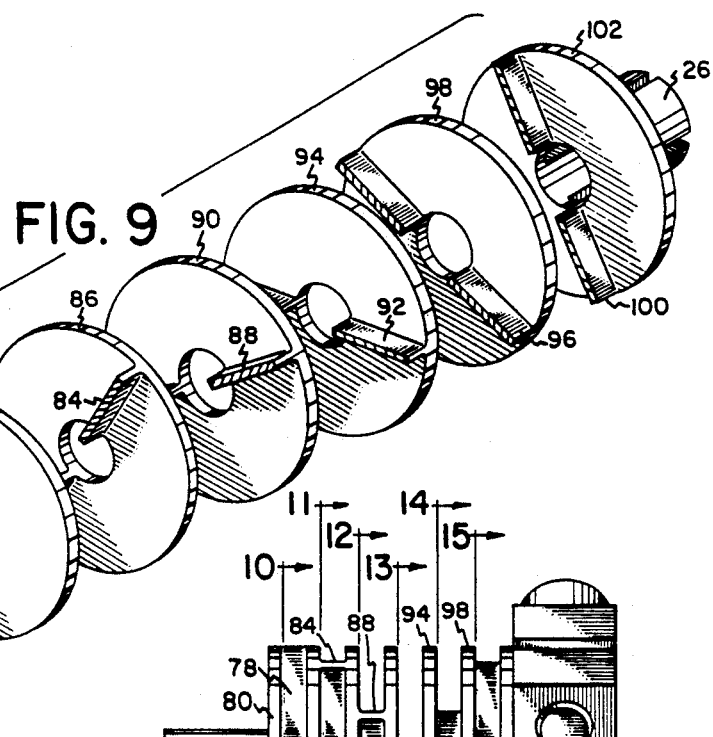
FIG. 9 is an exploded perspective view of the constant velocity flexible coupling of FIG. 8 showing adjacent beams between successive disks offset by 30°.
Figure 8:
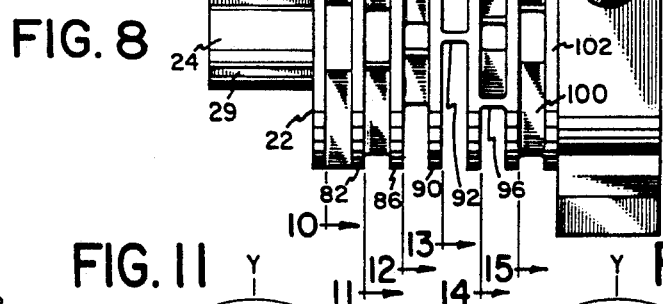
FIG. 8 is an elevational front view of another embodiment of a constant velocity flexible coupling showing adjacent beams between disks offset by 30°, with the clamp of FIG. 5, and a bore running axially through slotted members of the body.
Figure 10:
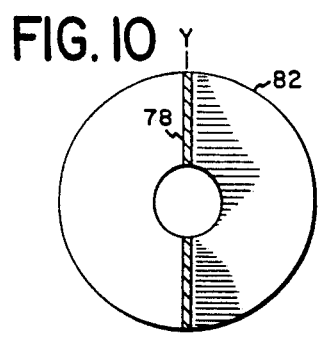
FIG. 10 is a transverse sectional view through a slot taken on a plane essentially along the line 10—10 of FIG. 8 showing vertical positioning of a beam between two adjacent disks.
Figure 11:
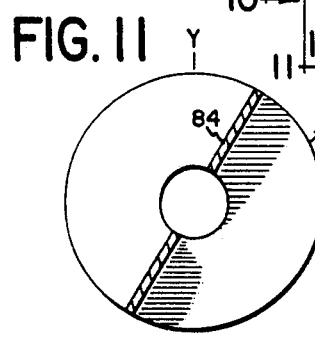
FIG. 11 is a transverse sectional view through a slot taken on a plane essentially along the line 11—11 of FIG. 8 showing a beam 30° offset from the beam shown in FIG. 10.
Figure 12:
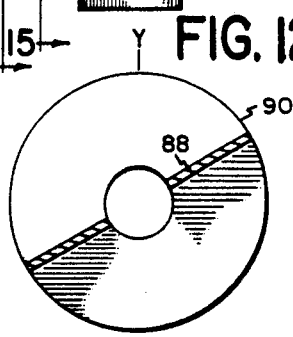
FIG. 12 is a transverse sectional view through a slot taken on a plane essentially along the line 12—12 of FIG. 8 showing a beam 30° offset from the beam shown in FIG. 11.
Figure 13:
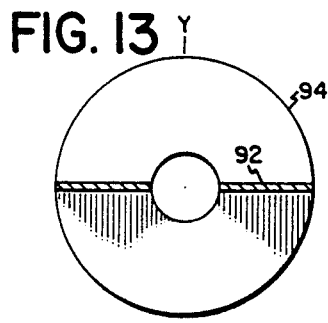
FIG. 13 is a transverse sectional view through a slot taken on a plane essentially along the line 13—13 of FIG. 8 showing a beam 30° offset from the beam shown in FIG. 12.
Figure 14:
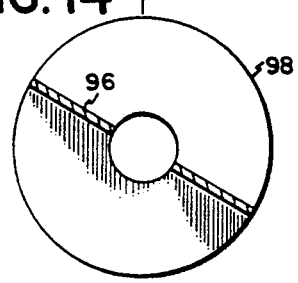
FIG. 14 is a transverse sectional view through a slot taken on a plane essentially along the line 14—14 of FIG. 8 showing a beam 30° offset from the beam shown in FIG. 13.
Figure 15:
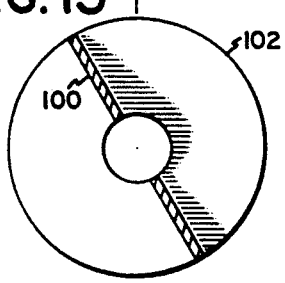
FIG. 15 is a transverse sectional view through a slot taken on a plane essentially along the line 15—15 of FIG. 8 showing a beam 30° offset from the beam shown in FIG. 14.

FIGS. 8 through 15 show another embodiment of the present invention wherein the body 22 comprises a plurality of disks formed by complementary pairs of slots forming beams therebetween which are offset by 30°. Referring to FIGS. 8, 9, and 10, a first beam 78 is disposed between a first disk 80 and a second disk 82. The first beam 78 is aligned with vertical axis y and thus has a zero degree orientation with respect to vertical axis y. Referring to FIGS. 8, 9, and 11, a second beam 84 is disposed between the second disk 82 and a third disk 86. The beam 84 is offset 30° clockwise from the y axis. Referring to FIGS. 8, 9, and 12, a third beam 88 is disposed between the third disk 84 and a forth disk 90 and is offset clockwise 60° from the y axis. Referring to FIGS. 8, 9, and 13, a forth beam 92 is disposed between the fourth disk 90 and a fifth disk 92 and is offset clockwise 90° from the y axis. Referring to FIGS. 8, 9, and 14, a fifth beam 96 is disposed between the fifth disk 92 and a sixth disk 98 and is offset clockwise 120° with respect to the y axis. Finally, referring to FIGS. 8, 9, and 15, a sixth beam 100 is disposed between the sixth disk 98 and a seventh disk 102 and is offset clockwise from the y axis by 150°. As is readily apparent from the drawings, each beam is offset 30° from any adjacent beam. This arrangement provides a coupling which has a greater torsional rigidity than a coupling with 90° offset beams. The smaller angular offset between beams results in a smoother transition between the torsional loading of adjacent beams. For example, a coupling having 12 beams wherein each beam is offset from adjacent beams by 45°, is more flexible and is more torsionally rigid than a coupling having 6 beams, wherein each beam is offset from adjacent beams by 90°.

While a flexible coupling embodiment having disks and beams distributed therealong in 30° offset orientations has been described, other embodiments can be made with a greater or smaller number of disks and beams and other offset distributions therealong without departing from the spirit of the invention.

Thus, what has been described is a constant velocity flexible coupling for joining two misaligned shafts so as to allow the transfer of torque at substantially constant angular velocity from a first shaft to a second shaft. While the preferred embodiment of the present invention has been described and illustrated, it is understood that the preferred embodiment is capable of variation, addition, omission, and modification without departing from the spirit and scope of the invention.

What is claimed is:

1. A flexible coupling for joining two shafts comprising:

a unitary solid cylindrical body have a first end, a second end and a means for flexing disposed between said first end and said second end;

a first cylindrical hub, protruding coaxially from said first end of said cylindrical body, for connecting said coupling to a first shaft, said first cylindrical hub having a first end, a second end and a plurality of equally spaced slots extending lengthwise from a point adjacent to said first end of said first cylindrical hub through said second end of said first cylindrical hub, and wherein said first end of said first cylindrical hub is joined to said first end of said cylindrical body;

a second cylindrical hub, protruding coaxially from said second end of said cylindrical body, for connecting said coupling to a second shaft, said second cylindrical hub having a first end, a second end and a plurality of equally spaced slots extending lengthwise from a point adjacent to said first end of said second cylindrical hub through said second end of said second cylindrical hub, and wherein said first end of said second cylindrical hub is joined to said second end of said cylindrical body;

a first counterbalanced clamp for securing said first cylindrical hub to said first shaft, said first counterbalanced clamp having a single radial slot, a clamping screw and a counterweight, whereby said clamping screw draws said single radial slot together and said counterweight is positioned on said first counterbalanced clamp so as to counterbalance the weight of said clamping screw when said first counterbalanced clamp is positioned over said first cylindrical hub; and a second counterbalanced clamp for securing said second cylindrical hub to said second shaft, said second counterbalanced clamp having a single radial slot, a clamping screw and a counterweight, whereby said clamping screw draws said single radial slot together and said counterweight is positioned on said second counterbalanced clamp so as to counterbalance the weight of said clamping screw when said clamp is positioned over said second hub.

2. A flexible coupling for joining two shafts comprising:

a unitary solid cylindrical body having a first end, a second end and a means for flexing disposed between said first end and said second end, said means for flexing comprising an alternating arrangement of a first plurality of longitudinally spaced slots and a second plurality of longitudinally spaced slots, said first plurality of slots being arranged in complementary oppositely disposed pairs and extending to a predetermined radial depth so as to form adjacent walls and a beam therebetween and said second plurality of slots being arranged in complementary oppositely disposed pairs and extending to a predetermined radial depth so as to form adjacent walls and a beam therebetween which is angularly offset 90° from a beam formed by a pair of slots of said first plurality;

a first cylindrical hub, protruding coaxially from said first end of said cylindrical body, for connecting said coupling to a first shaft, said first cylindrical hub having a first end, a second end and a plurality of equally spaced radial slots extending from a point adjacent to said first end of said first cylindrical hub through said second end of said first cylindrical hub, and wherein said first end of said first cylindrical hub is joined to said first end of said cylindrical body; and a second cylindrical hub, protruding co-axially from said second end of said cylindrical body, for connecting said coupling to a second shaft, said second cylindrical hub having a first end, a second end and a plurality of equally spaced radial slots extending from a point adjacent to said first end of said second cylindrical hub through said second end of said second cylindrical hub, and wherein said first end of said hub is joined to said second end of said cylindrical body.

3. The flexible coupling of claim 2, wherein said body is dimensioned so that adjacent walls of said alternating arrangement of said first plurality and said second plurality of longitudinally spaced slots contact at the circumference of said cylindrical body prior to the flexing of said beams beyond the elastic limit of the cylindrical body.

4. The flexible coupling of claim 2, wherein the beams have uniform thickness along an axial length.

5. The flexible coupling of claim 2, wherein the beams have varying thickness along an axial length.

6. The flexible coupling of claim 2, further comprising a first counterbalanced clamp for securing said first cylindrical hub to said first shaft, said first counterbalanced clamp having a single radial slot, a clamping screw and a counterweight, whereby said clamping screw draws said single radial slot together and said counterweight is positioned on said first counterbalanced clamp so as to counterbalance the weight of said clamping screw when said first counterbalanced clamp is positioned over said first cylindrical hub; and a second counterbalanced clamp for securing said second cylindrical hub to said second shaft, said second counterbalanced clamp having a single radial slot, a clamping screw and a counterweight, whereby said clamping screw draws said single radial slot together and said counterweight is positioned on said second counterbalanced clamp so as to counterbalance the weight of said clamping screw when said clamp is positioned over said second hub.

7. A flexible coupling for joining two shafts comprising:

a unitary solid cylindrical body having a first end, a second end and a plurality of longitudinally spaced slots, wherein said slots being arranged in complementary oppositely disposed pairs and extending to a predetermined depth so as to form adjacent walls and a beam therebetween, wherein each beam is angularly offset from adjacent beams and wherein each beam has a uniform thickness along an axial length;

a first cylindrical hub, protruding coaxially from said first end of said cylindrical body, for connecting said coupling to a first shaft, said first cylindrical hub having a first end, a second end and a plurality of diametric slots extending from a point adjacent to said first end of said first cylindrical hub to said second end of said first cylindrical hub, and wherein said first end of said first cylindrical hub is joined to said first end of said cylindrical body;

a second cylindrical hub, protruding coaxially from said second end of said cylindrical body, for connecting said coupling to a second shaft, said second cylindrical hub having a first end, a second end and a plurality of diametric slots extending from a point adjacent to said first end of said second cylindrical hub to said second end of said second cylindrical hub, wherein said first end of said second cylindrical hub is joined to said second end of said cylindrical body;

a first counterbalanced clamp for securing said first cylindrical hub to said first shaft, said clamp having a radial slot, a clamping screw and a counterweight, whereby said clamping screw draws said single radial slot together and said counterweight is positioned so as to counterbalance the weight of said clamping screw when said first counterbalanced clamp is positioned over the circumference of said first cylindrical hub; and a second counterbalanced clamp for securing said second cylindrical hub to said second shaft, said second counterbalanced clamp having a radial slot, a clamping screw and a counterweight, whereby said clamping screw draws said single radial slot together and said counterweight is positioned so as to counterbalance the weight of said clamping screw when said second counterbalanced clamp is positioned over said second cylindrical hub.

8. A flexible coupling for joining two shafts comprising:

a unitary solid cylindrical body having a first end, a second end and a means for flexing disposed between said first end and said second end, said means for flexing comprising a plurality of longitudinally spaced radial slots, said slots being arranged in complementary oppositely disposed pairs and extending to a predetermined radial depth so as to form adjacent walls and a beam therebetween and wherein each beam is angularly offset from adjacent beams;

a first cylindrical hub, protruding coaxially from said first end of said cylindrical body, for connecting said coupling to a first shaft, said first cylindrical hub having a first end, a second end and a plurality of equally spaced radial slots extending from a point adjacent to said first end of said first cylindrical hub through said second end of said first cylindrical hub, and wherein said first end of said first cylindrical hub is joined to said first end of said cylindrical body; and a second cylindrical hub, protruding co-axially from said second end of said cylindrical body, for connecting said coupling to a second shaft, said second cylindrical hub having a first end, a second end and a plurality of equally spaced radial slots extending from a point adjacent to said first end of said second cylindrical hub through said second end of said second cylindrical hub, and wherein said first end of said hub is joined to said second end of said cylindrical body.

9. The flexible coupling of claim 8, wherein said body is dimensioned so that adjacent walls of said longitudinally spaced slots contact at said circumference of said body prior to the flexing of said beams beyond the elastic limit of said cylindrical body.

10. The flexible coupling of claim 8, wherein the beams have uniform thickness along an axial length.

11. The flexible coupling of claim 8, wherein the beams have varying thickness along an axial length.

12. The flexible coupling of claim 8 further comprising:

a first counterbalanced clamp for securing said first cylindrical hub to said first shaft, said first counterbalanced clamp having a single radial slot, a clamping screw and a counterweight, whereby said clamping screw draws said single radial slot together and said counterweight is positioned on said first counterbalanced clamp so as to counterbalance the weight of said clamping screw when said first counterbalanced clamp is positioned over said first cylindrical hub; and a second counterbalanced clamp for securing said second cylindrical hub to said second shaft, said second counterbalanced clamp having a single radial slot, a clamping screw and a counterweight, whereby said clamping screw draws said single radial slot together and said counterweight is positioned on said second counterbalanced clamp so as to counterbalance the weight of said clamping screw when said clamp is positioned over said second hub.

* * * * *